(12) United States Patent
Manders et al.

(10) Patent No.: US 7,502,820 B2
(45) Date of Patent: Mar. 10, 2009

(54) SYSTEM AND METHOD FOR OPTIMIZED PROPERTY RETRIEVAL OF STORED OBJECTS

(75) Inventors: Blake D. Manders, Kirkland, WA (US); Joseph D. Ternasky, Mountain View, CA (US); Oren Rosenbloom, Redmond, WA (US); Vladimir Sadovsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 799 days.

(21) Appl. No.: 10/836,260

(22) Filed: May 3, 2004

(65) Prior Publication Data

US 2006/0031384 A1     Feb. 9, 2006

(51) Int. Cl.
    *G06F 15/16* (2006.01)
(52) U.S. Cl. .................. 709/203; 709/217; 709/219; 709/231
(58) Field of Classification Search ............ 709/217, 709/219, 231, 203; 707/104.1, 1; 386/1, 386/4
    See application file for complete search history.

(56) References Cited

U.S. PATENT DOCUMENTS

| | | | |
|---|---|---|---|
| 5,887,193 A | | 3/1999 | Takahashi et al. |
| 6,133,908 A | | 10/2000 | Scibora et al. |
| 6,181,342 B1 | | 1/2001 | Niblack |
| 6,370,543 B2 | | 4/2002 | Hoffert et al. |
| 6,922,813 B1 * | | 7/2005 | Korenshtein .............. 715/762 |
| 7,194,701 B2 | | 3/2007 | Stavely et al. |
| 7,206,853 B2 | | 4/2007 | Eytchison et al. |
| 7,376,333 B2 * | | 5/2008 | Chung et al. ............ 386/52 |
| 2001/0014891 A1 | | 8/2001 | Hoffert et al. |
| 2001/0042107 A1 * | | 11/2001 | Palm .................. 709/218 |
| 2002/0112226 A1 * | | 8/2002 | Brodersen et al. ........ 717/140 |
| 2003/0014415 A1 | | 1/2003 | Weiss et al. |

(Continued)

FOREIGN PATENT DOCUMENTS

EP        0 637 157 A2     2/1995

(Continued)

OTHER PUBLICATIONS

Int'l Search Report dated Mar. 15, 2006 for corresponding PCT Appl. No. PCT/US04/24962.

(Continued)

*Primary Examiner*—Frantz B Jean
(74) *Attorney, Agent, or Firm*—Shook, Hardy & Bacon L.L.P.

(57) ABSTRACT

A system and related techniques are provided in the present invention, which generate an interrogation request from an initiator device, to a mobile or other media player. The binary objects which encode the content may include or have associated with them a set of corresponding object properties which help to define each object. According to embodiments of the invention, the initiator may communicate with the responding device using a media-aware protocol such that the initiator may identify one or all of the set of properties paired with all of the objects to be returned. The initiator may then present the objects along with the corresponding properties to a user to manipulate. Because properties may be retrieved in conjunction with, at the same time and using a unified retrieval scheme, the need to query each object identifier one by one for associated properties is removed.

31 Claims, 5 Drawing Sheets

U.S. PATENT DOCUMENTS

| | | | |
|---|---|---|---|
| 2003/0046437 | A1 | 3/2003 | Eytchison et al. |
| 2003/0110514 | A1* | 6/2003 | West et al. .................. 725/134 |
| 2003/0135661 | A1* | 7/2003 | Barker et al. ................ 709/316 |
| 2004/0125756 | A1 | 7/2004 | Lepore et al. |
| 2004/0205286 | A1 | 10/2004 | Bryant et al. |
| 2005/0278442 | A1 | 12/2005 | Motoyama et al. |
| 2006/0129938 | A1* | 6/2006 | Humpleman et al. ........ 715/734 |

FOREIGN PATENT DOCUMENTS

| | | |
|---|---|---|
| EP | 1 081 897 A1 | 3/2001 |
| EP | 1 199 874 A2 | 4/2002 |
| EP | 1 429 532 A2 | 6/2004 |
| WO | WO 98/59282 | 12/1998 |
| WO | WO 99/07111 | 2/1999 |
| WO | WO 2005/111869 A3 | 11/2005 |

OTHER PUBLICATIONS

Satran, J., Meth, K., "Internet Small Computer Systems Interface", Apr. 2004, IBM RFC 3720, EPC.

Erik Guttman, "Vendor Extensions for Service Location Protocol, Version 2", Oct. 6, 2001, p. 1-p. 7, European Patent Office.

Simpson, Daydreamer W. "PPP Vendor Extensions", May 1997, pp. 1-p. 5, IETF, EPC.

Scott O. Bradner, "Considerations on the Extensibility of IETF Protocols" Jun. 4, 2004, p. 1-p. 10, EPC.

Blake Manders; Oren Rosebloom, "Media Transfer Protocol" May 17, 2004, pp. 1-36, URL:http;//www.microsoft.com.

Corcoran, P. M., "Mapping Home-Network Appliances to TCP/IP Sockets Using a Three Tiered Home Gateway Architecture", Aug. 1998, IEEE Transactions.

EPC Search Report, EPO 0 40 10221, Jul. 15, 2005, Microsoft Corporation.

EPC Search Report, EPO 0 50 14693, Nov. 24, 2005, Microsoft Corporation.

U.S. Patent and Trademark Office, U.S. Appl. No. 10/836,261, Filed: May 3, 2004; NonFinal OA Rejection, Apr. 19, 2007; Amendment after NonFinal Rejection, Jul. 19, 2007; Response to NonCompliant Amendment, Jul. 31, 2007; Final OA Rejection, Oct. 11, 2007; Amendment After Final Rejection, Dec. 11, 2007; Advisory Action, Jan. 10, 2008, RCE/Amendment, Feb. 11, 2008; NonFinal OA Rejection, Apr. 14, 2008; Amendment/Request Reconsideration after NonFinal, Jul. 14, 2008; and Final OA Rejection, Oct. 10, 2008.

U.S. Patent and Trademark Office, U.S. Appl. No. 10/429,116, Filed: May 2, 2003; Non-Final Rejection, Jan. 16, 2007; Amendment After Reconsideration, Apr. 16, 2007; Non-Final Rejection, Jun. 27, 2007; Amendment Req. After Non-Final, Sep. 11, 2007; Final Rejection, Nov. 28, 2007; Amendment after Final, Jan. 28, 2008; Advisory Action, Feb. 21, 2008; Amendment submitted with RCE, Mar. 28, 2008; Non-Final Rejection, Jun. 24, 2008; Amendment/Req. Reconsideration-After Non-Final Reject, Sep. 24, 2008.

* cited by examiner

SYSTEM AND METHOD FOR OPTIMIZED PROPERTY RETRIEVAL OF STORED OBJECTS

CROSS-REFERENCE TO RELATED APPLICATION

The subject matter of this application is related to the subject matter of co-pending U.S. patent application Ser. No. 10/429,116 filed May 2, 2003 entitled "System and Method for Facilitating Communication Between a Computing Device and Multiple Categories of Media Devices", assigned or under obligation of assignment to the same entity as this application, and which application is incorporated by reference herein.

STATEMENT REGARDING FEDERALLY SPONSORED RESEARCH OR DEVELOPMENT

Not applicable.

FIELD OF THE INVENTION

The invention relates to the field of computing, and more particularly to a platform which enables a client or other initiator to request an enumeration of objects stored on a portable media or other device, such as an MP3 player or digital camera, and efficiently retrieve a list of those objects along with their associated properties.

BACKGROUND OF THE INVENTION

The proliferation of portable media devices such as MP3 music players, digital cameras, media-enabled cellular telephone and others has encouraged the exchange of media objects of many types. For example, a user who wishes to view the contents of a digital camera may attach that device to their computer or other client, to view the collection of photographs stored on the memory card of that device, for instance to choose selected pictures to upload, print or delete. Music files are another commonly exchanged media object.

As illustrated in FIG. 1, when a user operating a client or initiator sends a request to the portable media device to see a list of all stored media objects, the device's built-in intelligence may mediate that request to access the internal content list. Many or most media players store content in object format, in which the media object such as a sound file or digital photograph stored in binary format is paired with a set of properties or attributes describing that object. For example the properties may include a codec type for sound files, a color depth for digital photographs, or other attributes or characteristics. It may be necessary for the device reading those objects to have access to the properties as well as the underlying object, to play or consume them.

When the user is asking for a list or enumeration of those objects, the media device may according to known protocol technologies respond with a content list or ID list which identifies the set of songs, photographs, video clips or other objects or media stored on the device, in total. However, according to known transfer protocols that type of responsive data does not include the set of properties paired with each object (nor the objects themselves). Among other things, this means that the initiator can not determine attributes for the media inventory which it has just received, so that for example the play time, artist, language or other properties of a set of songs can not be viewed just by retrieving the content list. Rather, the portable media device must sequentially request the set of properties paired with each object identified in the content list which has been retrieved, one after the other. In another regard, this may mean that all media objects on the portable device must be parsed to locate a single song, photograph or other content of interest.

However, the storage subsystems of such portable media machines may often be optimized for the device's own internal access purposes, and not for external delivery. Moreover, because the access time for the storage embedded in the media device, for example a CD-ROM drive, microdrive or other rotating or electronic media, as well as internal processing throughput is typically significantly slower than the access or processing time of the initiating client, the need to separately request the properties for each object can create a substantial access bottleneck.

On for example a portable music device storing hundreds or thousands or MP3 or other audio files, this may amount to delays of many minutes or more as the initiator is forced to transmit hundreds or thousands of object property requests to the device, even when those requests and the response are transmitted over relatively fast connections such as USB 2.0 or Firewire™ connections. Other problems in media object management and portability exist.

SUMMARY OF THE INVENTION

The invention overcoming these and other problems in the art relates in one regard to a system and method for optimized property retrieval of media objects, in which an initiator may communicate with a responder using a media transfer protocol whose characteristics permit the flexible exchange of objects and their accompanying properties, on an aggregate level. In embodiments of the invention in one regard, the initiator may send an enumeration request to a portable media or other device, which request may encode the selection and retrieval of one or more properties which may be associated with each object. That enumeration request may be processed for each object stored on the device, without the need to separately request the properties for each object located. The properties for each object may be returned in a well-defined data structure which the initiator may efficient detect and decode. The cycle time for accessing and viewing the content list along with all associated properties on a portable media device may therefore be significantly improved.

DETAILED DESCRIPTION OF EMBODIMENTS

Figure 1:
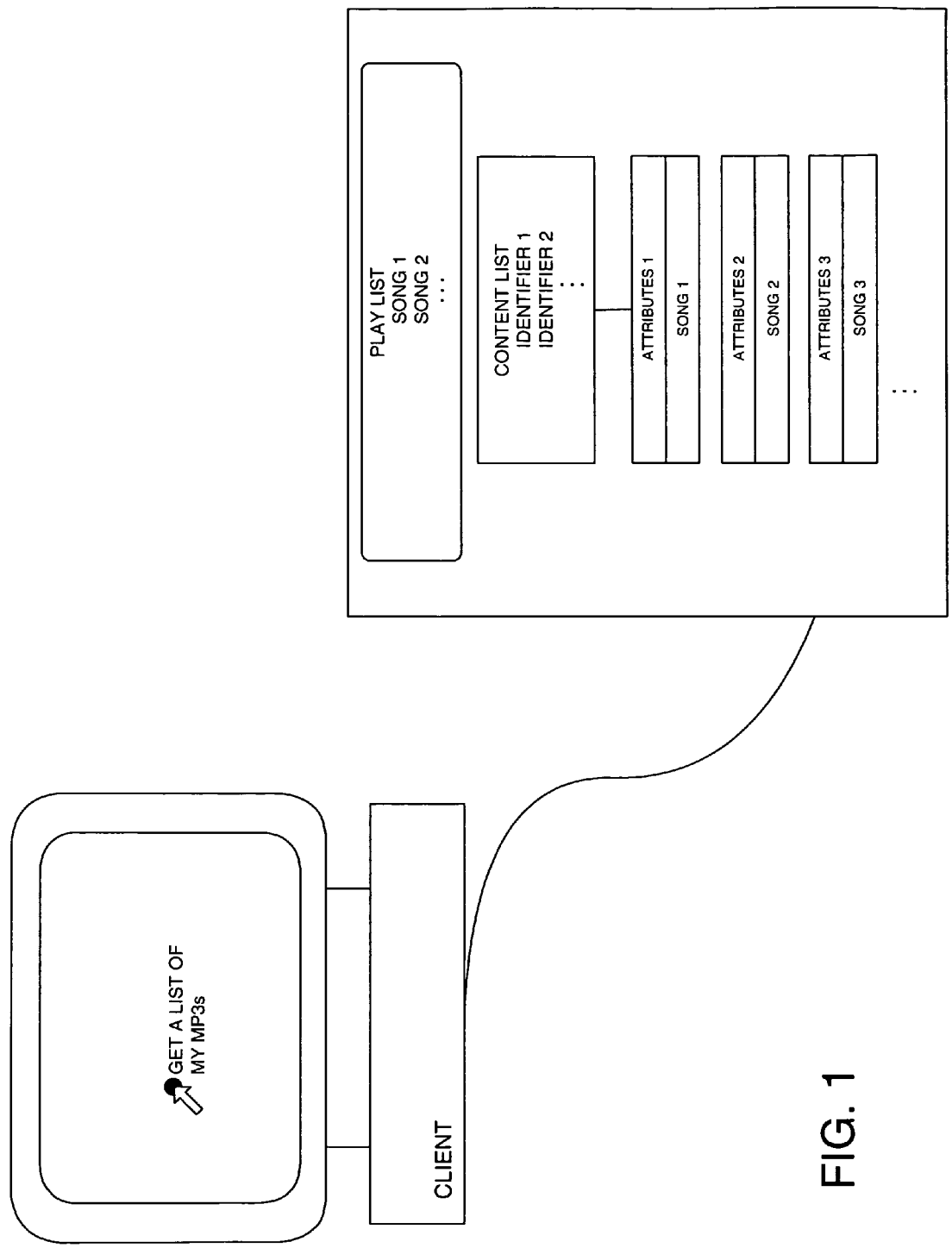
FIG. 1 illustrates exemplary retrieval of media object properties, according to known protocol technologies.
Figure 2:
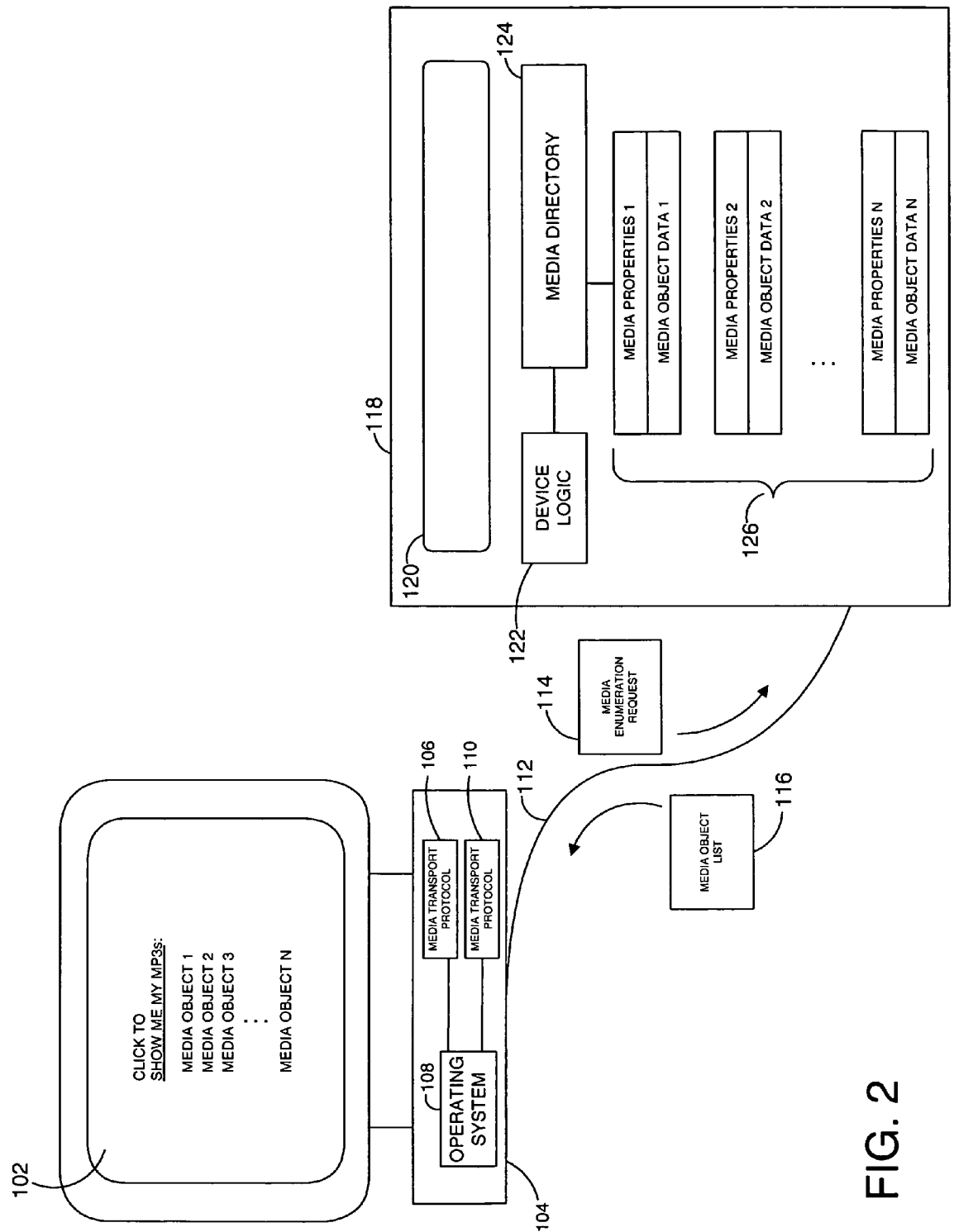
FIG. 2 illustrates an environment in which a system for optimized property retrieval may operate, according to embodiments of the invention.

FIG. 2 illustrates an architecture in which a system and method for optimized retrieval of object properties may operate, according to an embodiment of the invention. As illustrated in that figure, a user may operate a client computer or other initiator 104, for example via a user interface 102 to initiate media object retrieval activities, including streamed or aggregate retrieval of media object properties. According to the invention in one regard, the retrieval operations may be performed on media objects and associated data stored on a media player or other responder 118. The responder 118 may be or include, for example, an audio player or playback device such as an MP3 (MPEG-1, Audio Layer 3), Windows™ Media Audio player, Advanced Audio Coding (AAC) or other audio device, a digital camera such as a digital camera storing JPG (Join Photographic Experts Group) or other files or objects, a digital camcorder such as a digital video (DV), miniDV, digital versatile disk (DVD) or other video capture or playback device, a media-enabled cellular telephone such as a digital camera-equipped cellular device, a personal digital assistant or other platforms, hardware or devices.

The responder 118 may host or contain a set of media objects 126 encoding the audio, video, image or other media or content stored thereon. The set of media objects 126 may include, for example, a set of audio objects, such as music, voice recordings or other audio content, digital photographs such as those downloaded from a digital camera, from a photo sharing or other Internet site, or other source, a set of video objects such as DV-compatible video clips, or other objects, media or content. The responder 118 may store the set of media objects 126 in or organized by a media directory 124, which may be or include a file hierarchy or indexing format for storing or accessing the set of media objects 126 to or from a hard drive, flash memory, optical drives such as CR-ROM or CD-ROM R/W, DVD or other magnetic, optical, electronic or other media stores. The responder 118 may communicate with the initiator via a connector 112 such as a universal serial bus (USB) 2.0 connection, FireWire™ connection or other wired or wireless port, interface or connection. The responder 118 may operate under control of embedded device logic 122, which may be, include or interface to a microprocessor, microcontroller, digital signal processor or other control circuitry, along with for instance firmware or other programming. Responder may include an interface 120 such as an LCD screen to display media object data and other information, such as song lists, photograph slideshows or other data or displays.

In operation of the invention according to embodiments as shown, the user may for instance manipulate the user interface 102 to choose a media object retrieval function, for instance via a media engine 106 which may be in communication with an operating system 108, such as the Windows™ family of operating systems or others. When object enumeration is desired, the media engine 106 may generate a media enumeration request 114 passed through operating system 108 and communicated to the responder 118, for example, via a media transport protocol 110. The media transport protocol 110 may in embodiments be or include, for example, the protocol described in the aforementioned U.S. patent application Ser. No. 10/429,116 or other protocols or standards.

Figure 3:
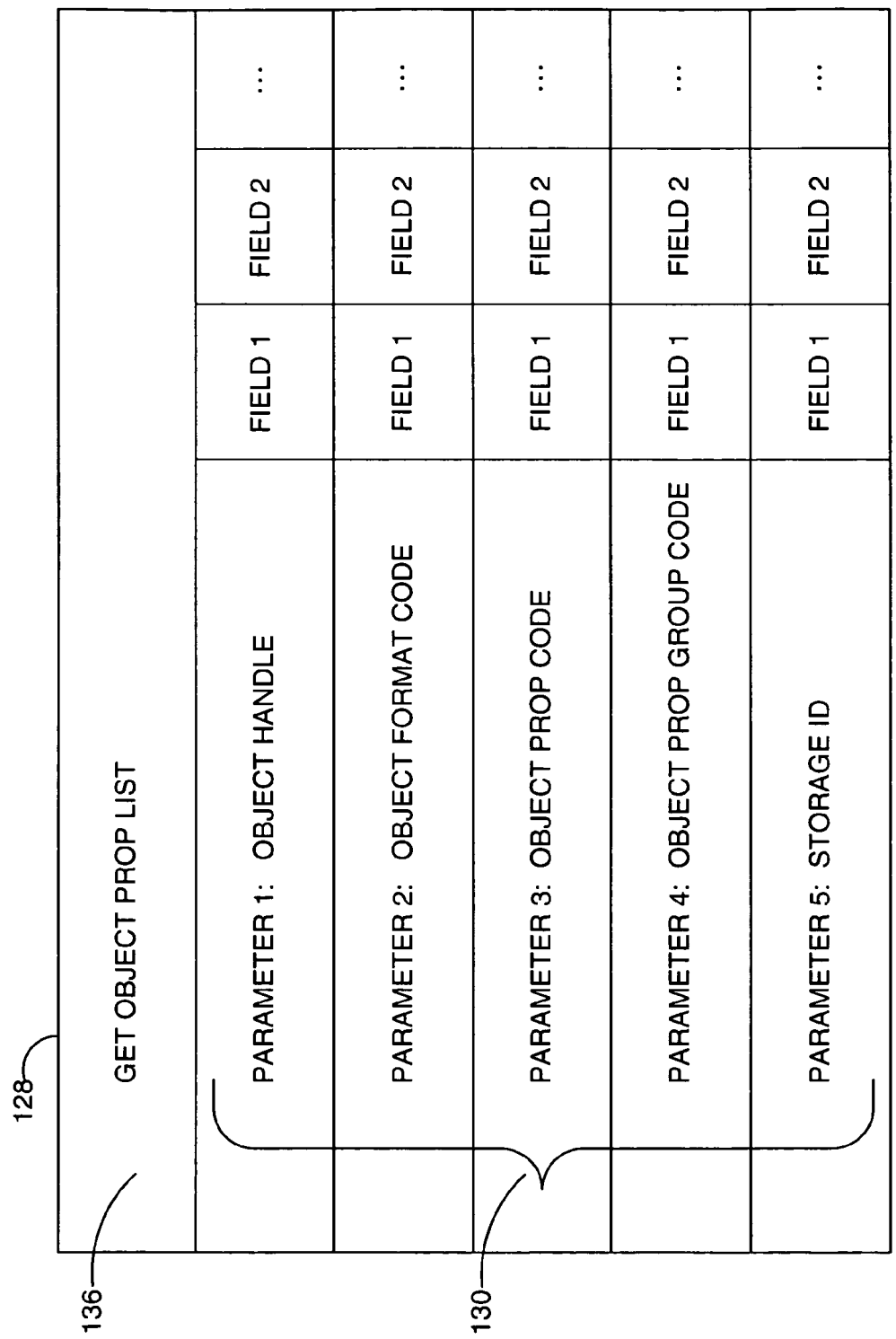
FIG. 3 illustrates an aggregate object property retrieval code, which may be used in object property retrieval according to embodiments of the invention.

The media enumeration request 114 so generated is in one regard not limited to a retrieval mechanism whereby only a list of media object identifiers may be globally retrieved, necessitating further requests and overhead to view the properties or attributes coupled to those objects. Rather, according to embodiments of the invention, the media enumeration request 114 may be configured and enabled to request object properties for some or the entire collection of objects in responder 118, in one command structure. In that regard and according to embodiments of the invention illustrated in FIG. 3, the media enumeration request 114 include a dedicated command structure, illustratively an aggregate object property command 128 whose parameters and execution permit the retrieval of object properties for some or all of the set of object properties associated with various of the set of media objects 126. More particularly and as shown, the aggregate object property command 128 may include a command header 136, illustratively designated as "GetObjectPropList". Other command names or designations may be used.

The aggregate object property command 128 may likewise contain a set of parameters 130, illustratively five in number although in implementations, other numbers or types may be used. The set of parameters 130 may include for example an object handle as Parameter 1, permitting the initiator 104 to specify a specific ObjectHandle for which it wishes to retrieve property, attribute or metadata information, or in desired cases a predetermined value indicating that property data is desired for all available media objects. The set of parameters 130 may include an object format code as Parameter 2, which for example may permit the request to be constrained to objects of a particular type, such as an audio, graphical or other type amongst all types or categories of objects in the set of media objects 126 stored on responder 118.

The set of parameters 130 may likewise include an object property code as Parameter 3, for example to constrain or specify the type or types of properties, attributes or metadata to be retrieved for objects identified by other of the parameters. The set of parameters 130 may furthermore include an object property group code as Parameter 4. According to this parameter the initiator 104 may specific a collection of object properties which will be needed from all retrieved media objects in the set of media objects 126. For instance for a responder 118 storing audio objects, the object property group code may indicate that song title, artist, album name and year of release will be retrieved for all media objects. According to embodiments of the invention in one regard, the initiator 104 may therefore specify desired object properties or all available properties for all of the set of media objects 126, by issuing one command containing an appropriate object property group code. The set of parameters 130 may likewise contain a storage ID as Parameter 5, to indicate for example that a hard disk or other media will be accessed. Other parameter types, numbers and orders are possible.

Figure 4:
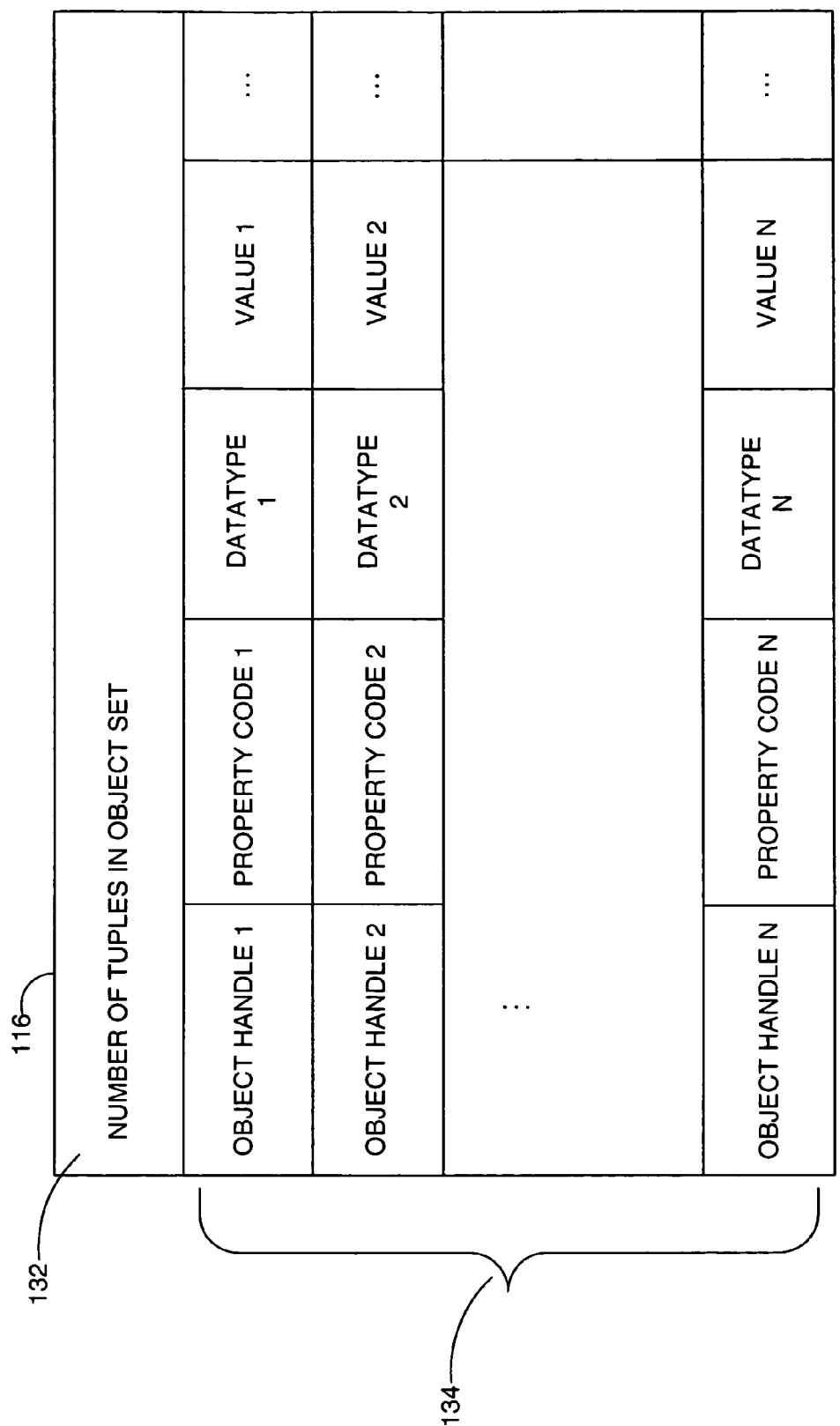
FIG. 4 illustrates a data schema for a responsive set of object properties, according to embodiments of the invention.

As illustrated for example in FIG. 4, when the responder 118 receives the media enumeration request 114 contained the aggregate object property command 128 including one or more of the set of parameters 130, the device logic 122 of the responder 118 may process that request against the set of media objects 126 stored in its media directory 124 or otherwise to generate a resulting media object list 116. As shown the media object list 116 may be structured to contain a retrieved data header 132, illustratively contained a total number count of the data tuples contained in the responsive media object list 116. Those tuples may be contained in a set of retrieved media object parameters 134, illustratively containing at least a 4-tuple of data including an object handle, a property code, a data type and a value for each of the set of media objects 126 whose properties or metadata are being retrieved. Additional fields or data may be associated with each object handle or other key, and other data formats or arrangements may be used.

The media object list 116 may be received by the initiator 104, and for example sorted on one or more of the parameters contained in the set of retrieved media object parameters 134, such as for example to show the most recently dated photographic image objects first. Other sorts or orderings by initiator 104 are possible. According to aspects of the invention, the ability to sort, reorder and manipulate the media object list 116 may be significantly speeded up compared to attempting to order the set of media objects 126 for retrieval purposes on responder 118 itself. That is a result of the fact that in many cases initiator 104 may have substantially faster storage, memory, processor and other resources available to it than the often comparatively lightweight resources of responder 118, which may be optimized for other purposes, such as power consumption or stored data size.

Figure 5:
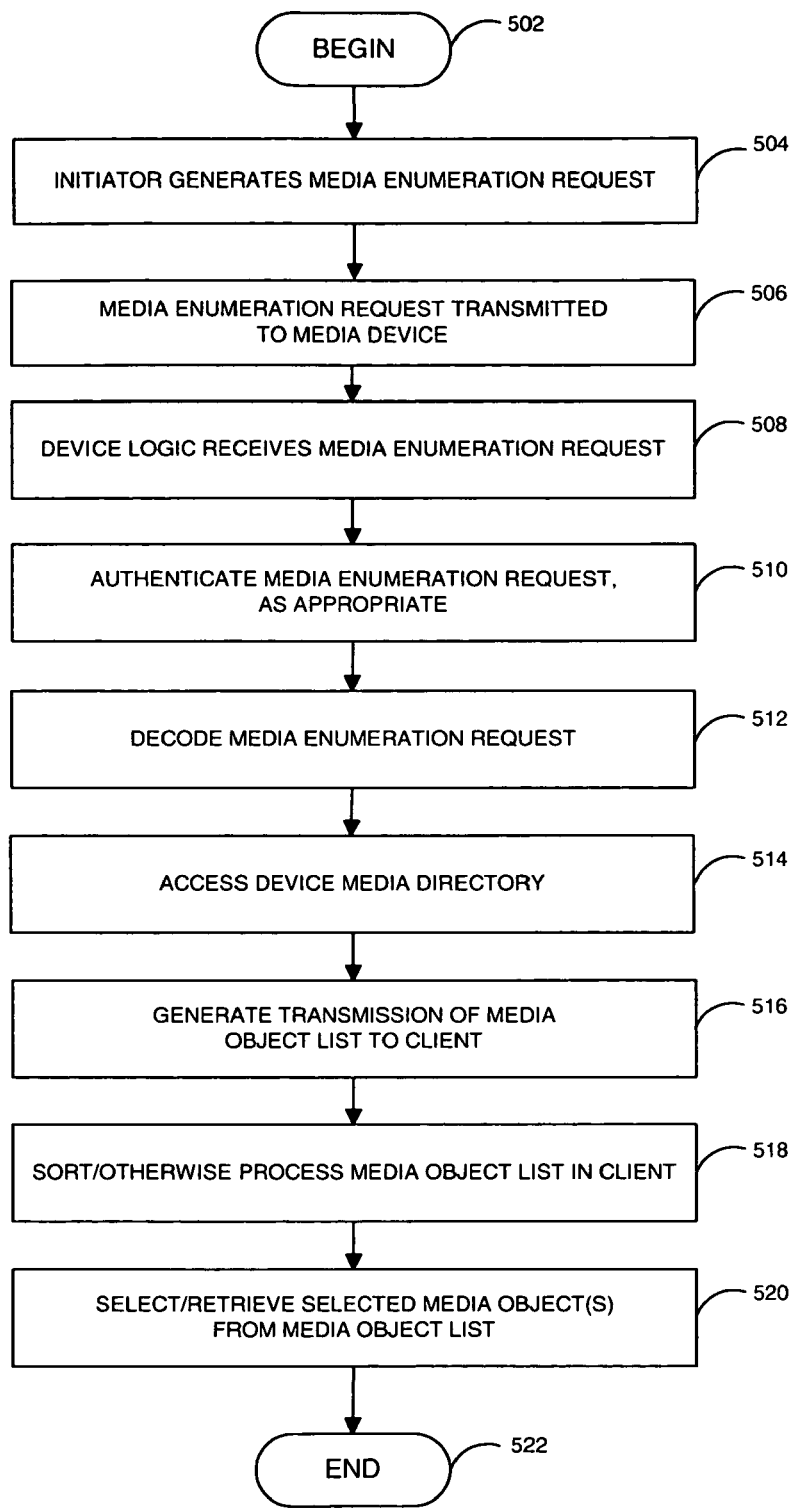
FIG. 5 illustrates a flowchart of overall object property retrieval, according to embodiments of the invention.

FIG. 5 illustrates a flowchart of overall media object property retrieval, according to embodiments of the invention. In step 502, processing may begin. In step 504, the initiator 104 may generate a media object enumeration request 114. In step 506, the media object enumeration request 114 may be transmitted to responder 118, such as a portable media player or device, for instance an MP3 or other audio player, a digital camera or digital video camcorder, a media-enabled cellular telephone, a personal digital assistant or other device or hardware. In step 508, the device logic 122 of responder 118 may receive the media object enumeration request 114. In step 510, the device logic 122 may in implementations authenticate the media object enumeration request 114 as appropriate, such as by prompting the user via interface 102 for a user name, password, media serial number or other identifier or authorization data. In further embodiments no authorization prompt may be generated.

In step 512, the device logic 122 may decode the media object enumeration request 114, for example by reading an aggregate object property command 128 and associated headers and fields, or other commands or instructions. In step 514, the media directory 124 of the responder 118 may be accessed, for instance to access directories or trees of media objects, or other data or storage structures. In step 516, the device logic 122 may generate a media object list 116 in response for transmission to initiator 104, for example by searching for specified object properties from within sets of properties associated with objects in set of media objects 126 stored on responder 118. According to embodiments of the invention in one regard, the set of media objects 126 need not be sorted or organized in a hierarchical or other special order before beginning a transmission stream to initiator 104. Rather, the device logic 122 may transmit a binary stream to initiator 104 without ordering or reordering the set of media objects 126 or their coupled properties, so that, for instance, the retrieved object property data may be streamed the in order in which it is stored on hard disk, optical or other storage of responder 118 to initiator 104.

In step 518, the resulting media object list 116 including media object properties matching the media enumeration request 114 may be sorted or otherwise processed in initiator 104. For example initiator 104 may present a table of songs, photographs, video samples or other media or content to the user via interface 102. In step 520, the user may highlight, select, link or activate select those media objects from the media object list 116 which the user wishes to download, delete, burn to optical media, copy, edit or perform other actions or tasks on. In step 522, processing may repeat, return to a prior processing point, jump to a further processing point or end.

The foregoing description of the invention is illustrative, and modifications in configuration and implementation will occur to persons skilled in the art. For instance, while the invention has generally been described in terms of the retrieval of a set of properties retrieved from a portable media device storing a set of associated media objects, in embodiments non-portable devices may be interrogated for object property retrieval, such as other desktop client or other machines. While those media objects have generally been illustratively described as being or including audio, video, or graphical content, in embodiments the set of media objects may likewise contain textual, character, numerical or other information, for example such as contact lists in a personal digital assistant, or data measurements or objects such as those retrieved from telemetry, medical or diagnostic hardware along with object properties corresponding to those applications. Likewise, while the initiator device has in embodiments generally been described as a desktop client or workstation, in embodiments the initiator could be or include a portable device such as a media-enabled cellular telephone, digital camera, audio player or other device or hardware. Portable devices moreover may interrogate each other, in implementations as desired.

Similarly, while the invention has in embodiments been described as operating in an environment in which a locally connected initiator interrogates a mobile media player or device, in embodiments the aggregate object property request and other queries may be transmitted from a remote initiator, such as a remote workstation or server connected over a local area network (LAN) or the Internet. Likewise, while the invention has generally been described as querying a single storage device or medium embedded in a mobile media device, in embodiments the object properties from two or more storage devices, such as two or more hard drives or two or more optical drives, may be collectively interrogated. Other hardware, software or other resources described as singular may in embodiments be distributed, and similarly in embodiments resources described as distributed may be combined. The scope of the invention is accordingly intended to be limited only by the following claims.

We claim:

1. A system for generating a request for retrieval of a set of media object properties, comprising:
    an interface to a responder device storing a set of media objects, each of the media objects having an associated set of media object properties; and
    a media engine, the media engine communicating with the interface to generate a media enumeration request comprising an aggregate object property command that includes a set of parameters, each parameter having one or more associated fields, each field specifying a value of an associated parameter, wherein, based on the aggregate object property command, the media enumeration request selectively retrieves a plurality of the media object properties corresponding to the set of parameters, for the set of media objects from the responder device.

2. A system according to claim 1, wherein the responder device comprises one of an audio player device, a digital camera device, a video camcorder device, a media-enabled cellular telephone, and a personal digital assistant.

3. A system according to claim 1, wherein the set of media objects comprises at least one of digital audio objects, digital image objects and digital video objects.

4. A system according to claim 1, wherein the set of media object properties comprises at least one of image width, image height, pixel color depth, object byte size, compression data, audio encoding type and video frame rate.

5. A system according to claim 1, wherein the communication with the responder device is communicated using a media transport protocol.

6. A system according to claim 1, wherein the retrieved media object properties and a media object list are streamed to an initiator device in response to the media enumeration request.

7. A system according to claim 6, wherein the initiator device reorders at least one of the media object properties and media object list.

8. A system according to claim 1, wherein each of the media objects comprises binary data.

9. A system according to claim 1, wherein the set of media objects is stored in a media directory of the responder device.

10. A method for generating a request for retrieval of a set of media object properties, comprising:
   accessing a responder device storing a set of media objects, each of the media objects having an associated set of media object properties;
   communicating a media enumeration request comprising an aggregate object property command to the responder device, wherein the aggregate object property command comprises a set of parameters, and wherein the set of parameters, by way of one or more values associated with each parameter, define the media object properties to be retrieved; and
   based on the set of parameters and the associated one or more values, retrieving a plurality of the media object properties associated with the set of media objects from the responder device.

11. A method according to claim 10, wherein the responder device comprises one of an audio player device, a digital camera device, a video camcorder device, a media-enabled cellular telephone, and a personal digital assistant.

12. A method according to claim 10, wherein the set of media objects comprises at least one of digital audio objects, digital image objects and digital video objects.

13. A method according to claim 10, wherein the set of media object properties comprises at least one of image width, image height, pixel color depth, object byte size, compression data, audio encoding type and video frame rate.

14. A method according to claim 10, wherein the communicating with the responder device comprises communicating using a media transport protocol.

15. A method according to claim 10, wherein the retrieving comprises streaming media object properties and a media object list to an initiator device in response to the media enumeration request.

16. A method according to claim 15, further comprising reordering at least one of the media object properties and media object list in the initiator device.

17. A method according to claim 10, wherein each of the media objects comprises binary data.

18. A method according to claim 10, wherein the set of media objects is stored in a media directory of the responder device.

19. One or more computer-readable storage media having computer-useable instructions embodied thereon for performing a method of generating a media object list, the method comprising :
   accessing a responder device storing a set of media objects, each of the media objects having an associated set of media object properties;
   communicating a media enumeration request comprising an aggregate object property command to the responder device, wherein the media enumeration request is configured to request a plurality of media object properties for the set of media objects in a single aggregate object property command that includes two or more parameters, each parameter having two or more associated fields that define the set of media object properties to be retrieved, and wherein the media enumeration request communicates to the responder device using a media transport protocol;
   based on the single aggregate object property command including the two or more parameters and the two or more associated fields, retrieving the plurality of the media object properties associated with the set of media objects from the responder device in the media object list; and
   reordering at least one of the plurality of media object properties and the media object list in an initiator device.

20. The media of claim 19, wherein the responder device comprises one of an audio player device, a digital camera device, a video camcorder device, a media-enabled cellular telephone, and a personal digital assistant.

21. The media of claim 19, wherein the set of media objects represented in the media object list comprises at least one of digital audio objects, digital image objects and digital video objects.

22. The media of claim 19, wherein the set of media object properties comprises at least one of image width, image height, pixel color depth, object byte size, compression data, audio encoding type and video frame rate.

23. The media of claim 19, wherein the retrieving comprises streaming media object properties and the media object list to the initiator device in response to the media enumeration request.

24. The media of claim 19, wherein each of the media objects comprises binary data.

25. A media player device having a processor and one or more computer-readable storage media, the media player device being configured to generate a media object list including a plurality of media object properties, comprising:
   a media object store, the media object store storing a set of media objects and associated media object properties, wherein the set of media object properties comprises at least one of image width, image height, pixel color depth, object byte size, compression data, audio encoding type and video frame rate;
   an interface to an initiator device, the initiator device transmitting a media enumeration request via the interface, wherein the media enumeration request is configured to request a plurality of media object properties corresponding to the set of media objects in an aggregate object property command that includes a set of parameters, each parameter having two or more fields that specify values associated with the parameter; and
   control logic, the control logic responding the media enumeration request to selectively retrieve a plurality of the media object properties, corresponding to the set of parameters for the set of media objects from the media object store.

26. The media player device according to claim 25, wherein the media player comprises one of an audio player device, a digital camera device, a video camcorder device, a media-enabled cellular telephone, and a personal digital assistant.

27. The media player device according to claim 25, wherein the set of media objects comprises at least one of digital audio objects, digital image objects and digital video objects.

28. The media player device according to claim 25, wherein the communication with the initiator device is communicated using a media transport protocol.

29. The media player device according to claim 25, wherein the retrieved media object properties and a media object list are streamed to the initiator device in response to the media enumeration request.

30. The media player device according to claim 25, wherein each of the media objects comprises binary data.

31. The media player device according to claim 25, wherein the media data store comprises a media directory.

* * * * *